(12) United States Patent
Sakata

(10) Patent No.: US 9,712,711 B2
(45) Date of Patent: Jul. 18, 2017

(54) IMAGE FORMING APPARATUS CONTROLLING PRINT TIMING

(71) Applicant: KYOCERA Document Solutions Inc., Osaka-shi, Osaka (JP)

(72) Inventor: Hiromi Sakata, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/051,581

(22) Filed: Feb. 23, 2016

(65) Prior Publication Data

US 2016/0255231 A1 Sep. 1, 2016

(30) Foreign Application Priority Data

Feb. 26, 2015 (JP) .................................. 2015-036800

(51) Int. Cl.
| | | |
|---|---|---|
| G06K 15/00 | (2006.01) | |
| G03G 15/00 | (2006.01) | |
| H04N 1/00 | (2006.01) | |

(52) U.S. Cl.
CPC ..... *H04N 1/00933* (2013.01); *H04N 1/00954* (2013.01)

(58) Field of Classification Search
CPC ........... H04N 1/00933; H04N 1/00954; G03G 15/00; G03G 21/00; G06F 3/1212; G06F 3/1267; G06F 5/06
USPC ...................................... 358/1.12, 1.14, 1.15
See application file for complete search history.

(56) References Cited

U.S. PATENT DOCUMENTS

| | | | | |
|---|---|---|---|---|
| 9,471,860 | B2 * | 10/2016 | Mihira | ................... G06F 3/1285 |
| 2003/0208607 | A1 * | 11/2003 | Yamazaki | ............. G06F 3/1204 |
| | | | | 709/229 |
| 2007/0127054 | A1 * | 6/2007 | Nishizawa | ......... H04N 1/00954 |
| | | | | 358/1.14 |
| 2008/0077717 | A1 * | 3/2008 | Okutsu | ................. G06F 3/1203 |
| | | | | 710/40 |
| 2008/0181648 | A1 * | 7/2008 | Makishima | ........... G06F 3/1204 |
| | | | | 399/75 |

(Continued)

FOREIGN PATENT DOCUMENTS

| | | |
|---|---|---|
| JP | 2002226132 A | 8/2002 |
| JP | 2004106994 A | 4/2004 |

(Continued)

OTHER PUBLICATIONS

English Machine Translation of JP 2015-001838-A (Moriya, Published Jan. 5, 2015).*

*Primary Examiner* — Benny Q Tieu
*Assistant Examiner* — Juan M Guillermety
(74) *Attorney, Agent, or Firm* — Alleman Hall Creasman & Tuttle LLP

(57) ABSTRACT

A control portion specifies an allowance time from a job reception time to a time at which a job sender reaches a self-apparatus, on the basis of allowance time specifying information acquired per print job data. Furthermore, the control portion controls a start time of a print process in accordance with an order in which an elapsed time from the job reception time is determined to have reached a planned start time. The planned start time is a time which is back-calculated from a time point when the allowance time elapses after the job reception, on the basis of a time required for the print process.

9 Claims, 11 Drawing Sheets

(56) References Cited

U.S. PATENT DOCUMENTS

| | | | |
|---|---|---|---|
| 2010/0290088 A1* | 11/2010 | Ito .................... | H04N 1/00591 358/1.16 |
| 2012/0019857 A1* | 1/2012 | Miyajima .......... | H04N 1/00596 358/1.15 |
| 2012/0268765 A1* | 10/2012 | Yamade .............. | G06F 17/5004 358/1.13 |
| 2013/0010334 A1* | 1/2013 | Akiba ................ | G03G 15/5083 358/1.16 |
| 2014/0368870 A1* | 12/2014 | Moritani ........... | G03G 15/5091 358/1.15 |
| 2015/0229808 A1* | 8/2015 | Matsumura ........... | H04N 1/442 358/1.13 |

FOREIGN PATENT DOCUMENTS

| | | |
|---|---|---|
| JP | 2006116859 A | 5/2006 |
| JP | 2009163593 A | 7/2009 |
| JP | 2014030076 A | 2/2014 |

* cited by examiner

IMAGE FORMING APPARATUS CONTROLLING PRINT TIMING

INCORPORATION BY REFERENCE

This application is based upon and claims the benefit of priority from the corresponding Japanese Patent Application No. 2015-036800 filed on Feb. 26, 2015, the entire contents of which are incorporated herein by reference.

BACKGROUND

The present disclosure relates to an image forming apparatus.

In general, an image forming apparatus that forms an image based on a print job acquired from a terminal apparatus via a network is known. The image forming apparatus performs a print process of forming an image represented by data of the print job, on a sheet material and discharging the printed matter to a discharged sheet receiving portion.

In addition, the image forming apparatus including a plurality of sheet discharge bins is known to discharge the printed matter to the sheet discharge bin corresponding to a user of a transmission source of the print job and to display user information on display means of the sheet discharge bin.

SUMMARY

An image forming apparatus according to one aspect of the present disclosure includes a job storage portion, a print processing portion, an allowance time specifying information acquisition portion, a start possibility determination portion, and a print time control portion. The job storage portion is a storage portion configured to temporarily store print job data received from a terminal apparatus via a network. The print processing portion includes a sheet conveying portion configured to convey a sheet material and an image forming portion configured to form an image on the sheet material being conveyed. The print processing portion is configured to perform a print process of forming an image represented by the print job data, on the sheet material and discharging a printed matter which is the sheet material on which the image has been formed, to a discharged sheet receiving portion. The allowance time specifying information acquisition portion is configured to acquire allowance time specifying information per the print job data. The allowance time specifying information is information used for specifying an allowance time from a time of reception of the print job data to a time at which a sender of the print job data reaches the self-apparatus. The start possibility determination portion is configured to determine whether each print job data stored in the job storage portion is in a start enabled state where a planned start time has come. The planned start time is a time which is back-calculated from a time point when the allowance time specified by the allowance time specifying information elapses after the reception of the print job data, on the basis of a time required for the print process. The print time control portion is configured to control a start time of the print process for each print job data stored in the job storage portion, in accordance with an order in which the print job data is determined as being in the start enabled state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. The following embodiments are examples embodying the present disclosure and do not have nature of limiting the technical scope of the present disclosure.

First Embodiment

First, a schematic configuration of an image forming system including an image forming apparatus 10 according to a first embodiment will be described with reference to FIG. 1.

Figure 1:
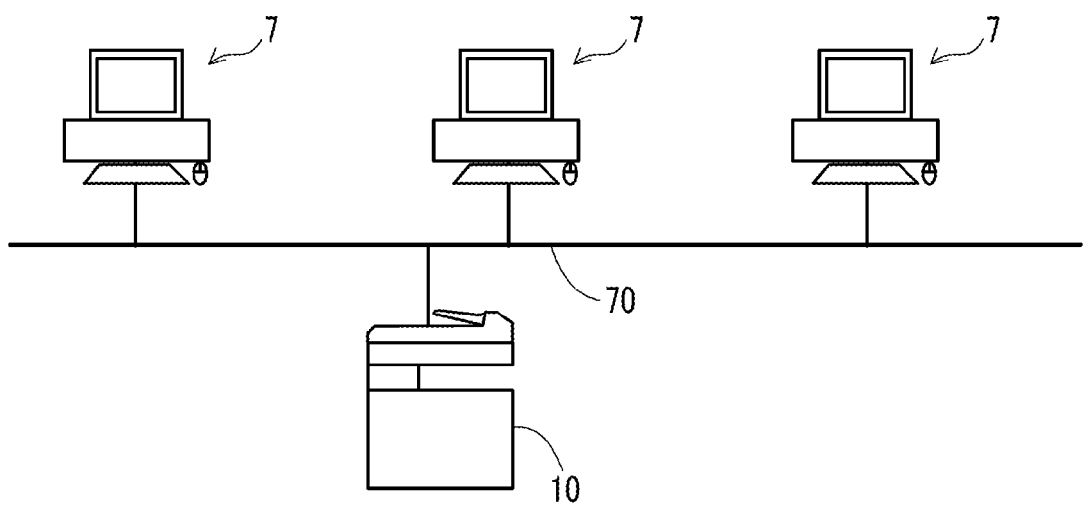
FIG. 1 is a configuration diagram of an image forming system including an image forming apparatus according to a first embodiment.

As shown in FIG. 1, the image forming system includes the image forming apparatus 10 and terminal apparatuses 7. The image forming apparatus 10 is able to communicate with the terminal apparatuses 7 via a network 70. The network 70 is, for example, a local area network (LAN). Each terminal apparatus 7 is an information processing apparatus such as a personal computer, a tablet computer, or a smartphone.

The image forming apparatus 10 has a function of a printer to receive print job data D0, which is data for image formation, from the terminal apparatus 7 and form an image represented by the print job data D0, on a sheet material. The image forming apparatus 10 according to the present embodiment is a multifunction peripheral further having a function of a copying machine and a function of a scanner. In addition, the image forming apparatus 10 may also have a facsimile communication function.

The image forming apparatus 10 that functions as the copying machine executes a copying job of reading an image of a document sheet 90 and forming the image of the document sheet 90 on a sheet material 9. The image forming apparatus 10 that functions as the scanner executes a document scan job of reading the image of the document sheet 90 and transmitting obtained image data of the document sheet 90 to the terminal apparatus 7. Each of the copying job and the document scan job is a job received by the image forming apparatus 10 in accordance with an operation performed by the user.

[Entire Configuration of Image Forming Apparatus 10]

Figure 2:
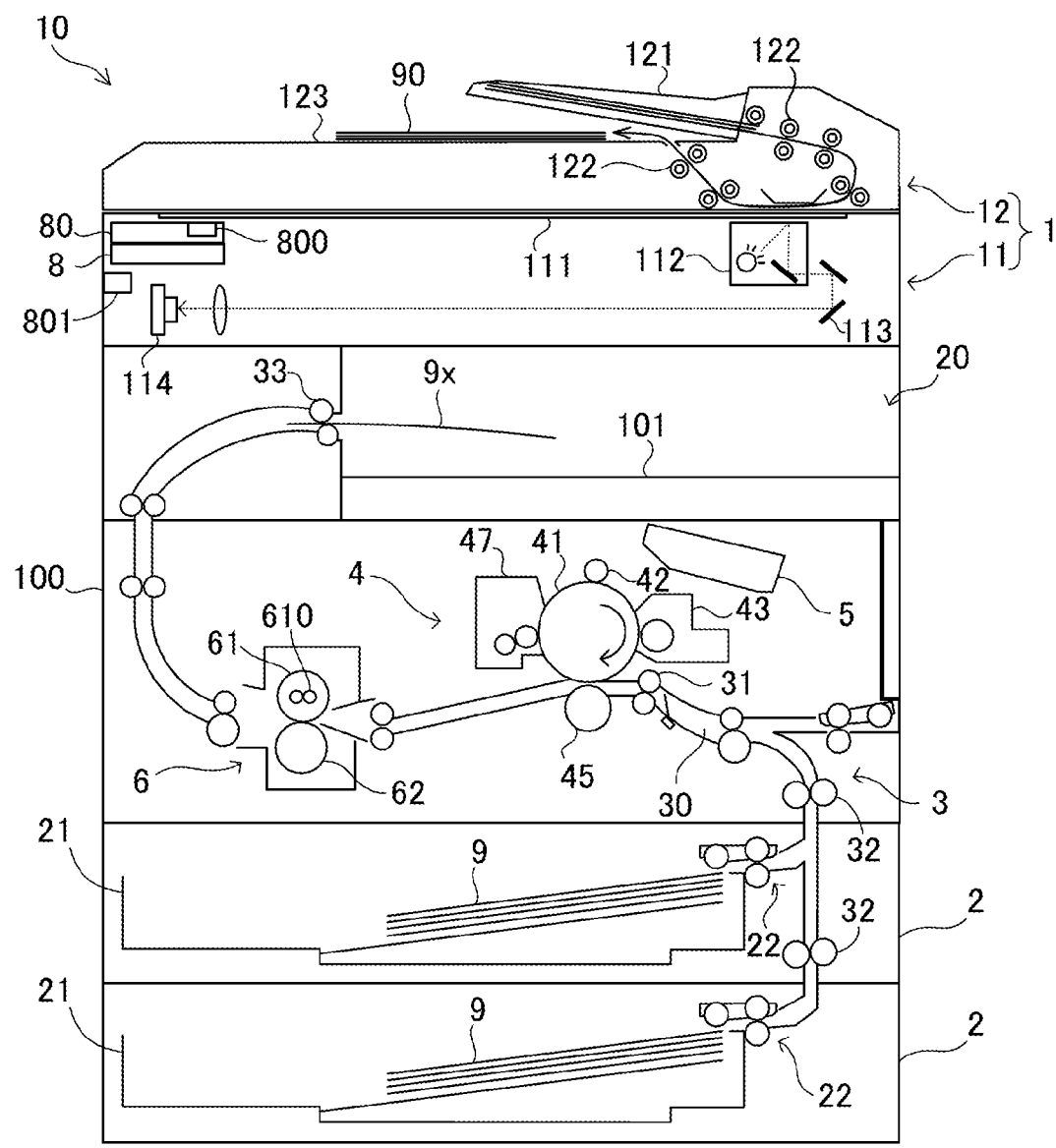
FIG. 2 is a configuration diagram of the image forming apparatus according to the first embodiment.

Next, a schematic configuration of the entirety of the image forming apparatus 10 will be described with reference to FIG. 2. The image forming apparatus 10 includes a sheet feed portion 2, a sheet conveying portion 3, an image forming portion 4, an optical scanning portion 5, and a fixing portion 6, etc. The image forming portion 4, the optical scanning portion 5, and the fixing portion 6 perform an electrophotographic image forming process.

The image forming apparatus 10 further includes a document conveying/reading portion 1, a control portion 8, an operation display portion 80, and a human sensor 801, etc.

The document conveying/reading portion 1 includes an image reading portion 11 and an auto document feeder (ADF) 12. The image reading portion 11 includes a document table 111, a reading unit 112, an optical system 113 such as a mirror and a lens, and an image sensor 114, etc.

The document table 111 is a portion on which the document sheet 90 is placed, and is provided at an upper surface of the image reading portion 11. The reading unit 112 applies light to the document sheet 90 that is present at a reading position on the document table 111, and reflects reflected light of the light toward the optical system 113. The reading unit 112 is movable in a sub-scanning direction. The sub-scanning direction is the right-left direction when FIG. 2 is seen.

The optical system 113 guides the reflected light from the document sheet 90, to the image sensor 114. The image sensor 114 includes a photoelectric conversion element, etc., and outputs an electric signal corresponding to an amount of received light, as image data representing the image of the document sheet 90, to the control portion 8.

The ADF 12 includes a plurality of conveying rollers 122 which convey the document sheet 90. The ADF 12 passes the document sheet 90 set on a document placement portion 121, through the reading position on the document table 111 and conveys the document sheet 90 to a discharged sheet receiving portion 123.

The sheet feed portion 2 includes a feed sheet receiving portion 21 and a sheet sending-out portion 22. The feed sheet receiving portion 21 is configured to allow a plurality of sheet materials 9 to be placed in a stacked manner thereon.

The sheet materials 9 are sheet-like image recording media such as paper, coated paper, postcards, envelopes, OHP sheets, and the like.

The sheet sending-out portion 22 sends out the sheet material 9 placed on the feed sheet receiving portion 21, one by one, toward a conveyance path 30 in the sheet conveying portion 3.

The sheet conveying portion 3 includes registration rollers 31, conveying rollers 32, and discharge rollers 33, etc. which convey the sheet material 9. The registration rollers 31 and the conveying rollers 32 convey the sheet material 9 fed from the sheet feed portion 2, along the conveyance path 30 toward the image forming portion 4. Furthermore, the discharge rollers 33 discharge a printed matter 9x which is the sheet material 9 on which an image has been formed, through a discharge port of the conveyance path 30 onto a discharged sheet receiving portion 101. In the present embodiment, the number of discharged sheet receiving portions 101 is one.

The image forming portion 4 forms an image on a surface of the sheet material 9 being conveyed along the conveyance path 30. The image forming portion 4 includes a drum-shaped photosensitive member 41, a charging portion 42, a developing portion 43, a transfer portion 45, and a cleaning portion 47, etc. The photosensitive member 41 is an example of an image carrier.

The photosensitive member 41 rotates, and the charging portion 42 uniformly charges the surface of the photosensitive member 41. Furthermore, the optical scanning portion 5 performs scanning with laser light thereby to write an electrostatic latent image onto the surface of the photosensitive member 41, and the developing portion 43 supplies toner to the photosensitive member 41 thereby to develop the electrostatic latent image into a toner image.

Furthermore, the transfer portion 45 transfers the toner image on the photosensitive member 41, onto the sheet material 9 moving on the conveyance path 30. Finally, the cleaning portion 47 removes the toner remaining on the surface of the photosensitive member 41.

The fixing portion 6 nips the sheet material 9 on which the toner image has been formed, between a fixing roller 61 housing a heater 610 and a pressure roller 62, and sends out the sheet material 9 to the following process step. At this time, the heater 610 heats the toner image formed on the sheet-like sheet material 9, via the fixing roller 61. By so doing, the fixing portion 6 fixes, onto the sheet material 9, the toner image (image) on the sheet material 9. The toner is an example of a developer.

In the following description, the sheet feed portion 2, the sheet conveying portion 3, the image forming portion 4, the optical scanning portion 5, and the fixing portion 6 are referred to as a print processing portion 20. The print processing portion 20 performs a print process of forming the image represented by the print job data D0, on the sheet material 9 and discharging the printed matter 9x which is the sheet material 9 on which the image has been formed, onto the discharged sheet receiving portion 101.

The operation display portion 80 includes: an information inputting operation portion including, for example, a touch panel and an operation button, etc.; and a display portion including a liquid crystal display panel and a notification lamp, etc. For example, the operation portion includes a start button through which start events for various processes such as a process (scan process) of reading the image of the document sheet 90 are caused to occur.

In the present embodiment, the operation display portion 80 includes an authentication information input portion 800.

The authentication information input portion 800 is a component through which user authentication information Du with which a user is identified is inputted in accordance with an operation performed by the user on the image forming apparatus 10. For example, a fingerprint sensor through which fingerprint information is inputted as the user authentication information Du, a radio frequency identifier reader (RFID reader) which reads the user authentication information Du from a RF tag (Radio Frequency Tag) close to the reader via short-range wireless communication, or an IC card reader which reads the user authentication information Du from an IC card, etc. may be used as the authentication information input portion 800.

The human sensor 801 is a sensor which detects a person close to the image forming apparatus 10. For example, the human sensor 801 may be an infrared ray sensor, an ultrasonic sensor, or the like.

The control portion 8 displays an operation menu and the like on the operation display portion 80. Furthermore, the control portion 8 controls electric devices such as a peripheral device and a motor on the basis of input information inputted through an operation of the operation display portion 80 and detection results of various sensors.

[Control Portion 8]

Figure 3:
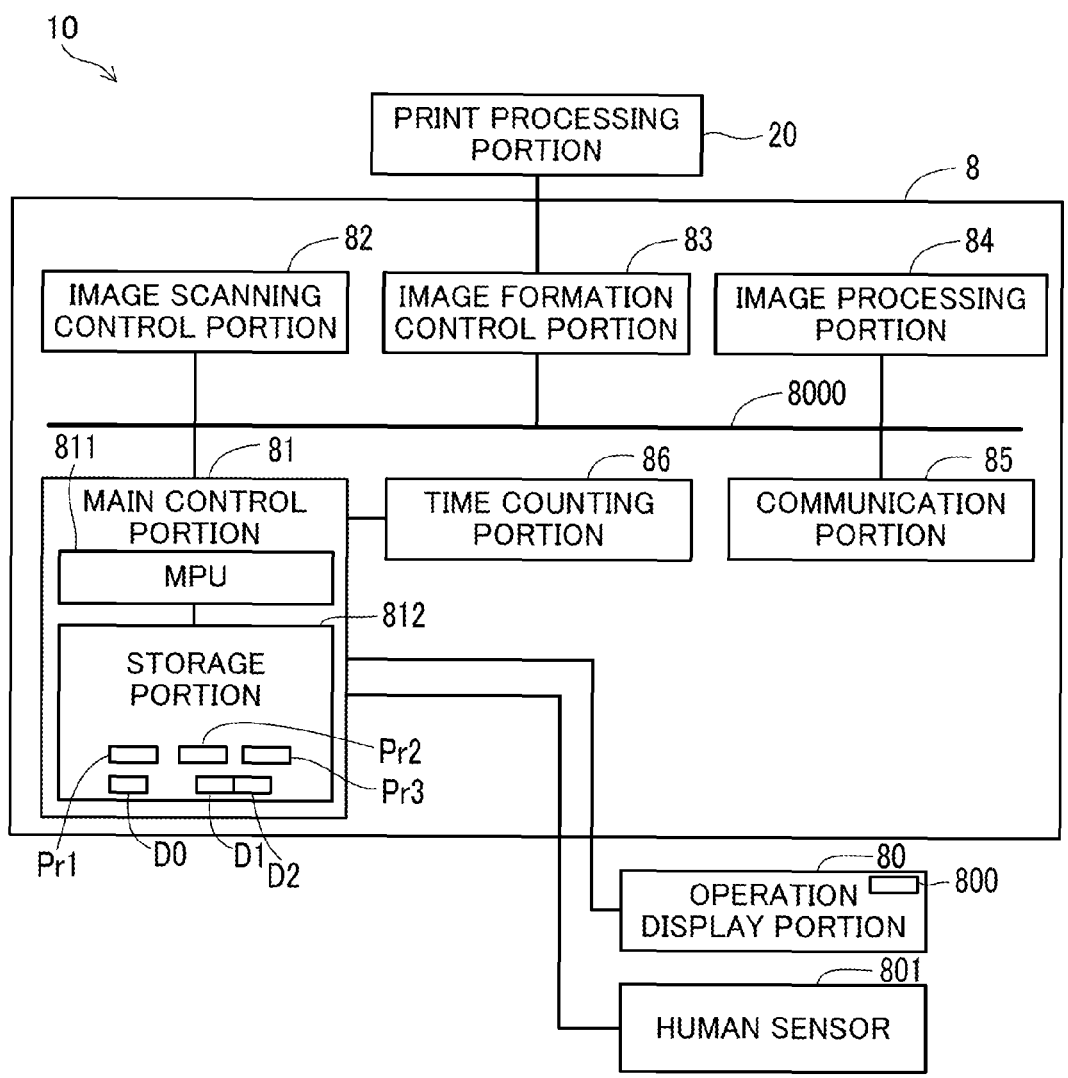
FIG. 3 is a block diagram of a control-related portion in the image forming apparatus according to the first embodiment.

Next, the configuration of the control portion 8 will be described with reference to FIG. 3. The control portion 8 includes a main control portion 81, an image scanning control portion 82, an image formation control portion 83, an image processing portion 84, a communication portion 85, and a time counting portion 86, etc. The main control portion 81 includes a microprocessor unit (MPU) 811 and a storage portion 812, etc.

The main control portion 81, the image scanning control portion 82, the image formation control portion 83, the image processing portion 84, and the communication portion 85 are connected to a bus 8000 and are able to exchange data with one another via the bus 8000.

The MPU 811 is a processor which performs various types of calculation and data processing. The storage portion 812 is a non-volatile storage portion which stores various types of information to which the MPU 811 refers. In addition, the storage portion 812 is also a storage portion on which reading and writing of various types of information by the MPU 811 are enabled.

For example, the storage portion 812 stores programs for causing the MPU 811 to perform various types of processing, and information to which the MPU 811 executing these programs refers, etc. In addition, the storage portion 812 also serves as a storage portion which temporarily stores the print job data D0 received from the terminal apparatus 7 via the network 70. The storage portion 812 is an example of a job storage portion.

The main control portion 81 centrally controls the image forming apparatus 10 by the MPU 811 executing various programs stored previously in the storage portion 812. The main control portion 81 also includes a volatile storage portion, such as a RAM, which temporarily stores a program for causing the MPU 811 to perform each step described later and is not shown.

The image scanning control portion 82 controls the document conveying/reading portion 1 to acquire image data of the document sheet 90 from the image reading portion 11. Furthermore, the image scanning control portion 82 transfers the document image data via the bus 8000 to another device such as the image processing portion 84 and the like.

The image formation control portion 83 acquires recording image data from the image processing portion 84 and causes the print processing portion 20 to perform the print process based on the recording image data. The recording image data is, for example, data of the image represented by the print job data D0.

The image processing portion 84 performs various types of data processing on image data and the like acquired from another device via the bus 8000. A target for the data processing by the image processing portion 84 is, for example, the document image data acquired from the image reading portion 11 via the image scanning control portion 82, or the print job data D0 acquired from the terminal apparatus 7 via the communication portion 85.

For example, the image processing portion 84 performs a process of converting the document image data acquired from the image scanning control portion 82 and the print job data acquired from the communication portion 85, into the recording image data, and transferring the recording image data to the image formation control portion 83. Furthermore, the image processing portion 84 also has a function to perform image processing, such as image rotation processing, halftone processing, or size cut processing, on the document image data acquired from the image scanning control portion 82.

The communication portion 85 is a communication interface which performs transmission and reception of data to and from an external apparatus such as the terminal apparatuses 7 via the network 70. Furthermore, the communication portion 85 exchanges data with another device of the image forming apparatus 10 via the bus 8000.

The time counting portion 86 is a clock circuit which counts time. Count information of the time counting portion 86 is transmitted to the main control portion 81.

Meanwhile, in a conventional image forming apparatus, before a user who has transmitted the print job data D0 from the terminal apparatus 7 reaches the apparatus, the printed matter 9x may be discharged to the discharged sheet receiving portion 101. In this case, there is a possibility that another user who has reached the image forming apparatus earlier does not notice that the user other than themselves has transmitted the print job data D0, and mistakenly takes the printed matter 9x.

For example, there is a case where a first user at a seat far from the position of the image forming apparatus transmits the print job data D0 earlier than a second user at a seat closer to the position of the image forming apparatus, and the printed matter 9x of the first user is discharged to the discharged sheet receiving portion 101 before the first user reaches the image forming apparatus. In this case, there is a possibility that the second user reaches the image forming apparatus earlier than the first user and mistakenly acquires the printed matter 9x of the first user.

In addition, it is conceivable that the image forming apparatus temporarily stores the received print job data D0 and performs the print process when identification information of the print job data D0 is inputted through an operation performed by the user. However, an operation of inputting the identification information each time the print job data D0 is transmitted is complicated.

On the other hand, the image forming apparatus 10 has a function to perform the print process in synchronization with timing at which the user who has transmitted the print job data D0 from the terminal apparatus 7 reaches the self-apparatus. This function is achieved by the control portion 8 performing later-described job wait control and standby job start control. Accordingly, it is made possible to prevent the printed matter 9x from being mistakenly taken. Hereinafter, the details thereof will be described.

In the present embodiment, the storage portion 812 of the main control portion 81 previously has stored allowance time specifying information D1 therein. The allowance time specifying information D1 is information used for specifying an allowance time is from the time at which the print job data D0 is received to the time at which the sender of the print job data D0 reaches the self-apparatus.

The allowance time specifying information D1 is associated with terminal identification information D2 which is identification information of each terminal apparatus 7. For example, address information of each terminal apparatus 7 on the network 70 or identification information of the user who uses each terminal apparatus 7 may be used as the terminal identification information D2. The storage portion 812 which stores the allowance time specifying information D1 is an example of a registered information storage portion. The user authentication information Du is an example of the identification information of the user.

[Job Wait Control]

Hereinafter, an example of the job wait control performed by the main control portion 81 will be described with reference to a flowchart shown in FIG. 4. The job wait control is performed by the MPU 811 executing a job wait control program Pr1.

For example, when the main control portion 81 activates, the main control portion 81 starts the job wait control. In the following description, S101, S102, . . . represent identification characters for respective steps executed by the main control portion 81.

<Step S101>

In the job wait control, first, the main control portion 81 monitors whether the print job data D0 is received from any terminal apparatus 7 via the communication portion 85, and receives the print job data D0.

<Step S102>

Upon reception of the print job data D0, the main control portion 81 determines whether the received print job data D0 is data for adjustment designation. The adjustment designation means to adjust timing at which the print process for the print job data D0 is to be performed, in accordance with the allowance time is of the transmission source of the print job data D0. Information indicating presence/absence of the adjustment designation is set in the print job data D0 by the terminal apparatus 7 in accordance with a selection operation performed by the user.

<Step S103>

If the print job data D0 is the data for the adjustment designation, the main control portion 81 stores the received print job data D0, transmission source information, and a data reception time tr in the storage portion 812 such that the received print job data D0, the transmission source information, and the data reception time tr are associated with each other. The transmission source information includes transmission source identification information D3 with which the transmission source of the received print job data D0 is identified. In addition, the transmission source information may include information, such as text information such as a name, a picture, or a figure, representing the sender of the print job data D0.

The data reception time tr is the time of the time counting portion 86 when the print job data D0 is received. The transmission source identification information D3 is, for example, the address information of the transmission source on the network 70. In addition, if the identification information of the user who uses the terminal apparatus 7 is included in attached information of the print job data D0, the identification information of the user may be used as the transmission source identification information D3.

The storage portion 812 is an example of the job storage portion which temporarily stores the print job data D0 received from the terminal apparatus 7 via the network 70.

<Step S104>

Furthermore, if a plurality of the print job data D0 the transmission sources of which are the same are present in the storage portion 812, the main control portion 81 performs a process of grouping the plurality of the print job data D0 the transmission sources of which are the same. The plurality of the grouped print job data D0 are associated with the data reception time tr of the print job data D0 that has been received last.

In the following description, the plurality of the grouped print job data D0 are referred to as a print job data group. The print job data group is a target for the print process, as a single unit.

<Step S105>

Furthermore, the main control portion 81 acquires, from the storage portion 812, the allowance time specifying information D1 corresponding to the transmission source of the presently received print job data D0. At this time, the main control portion 81 identifies the transmission source identification information D3 associated with the presently received print job data D0, identifies the terminal identification information D2 associated with the identified transmission source identification information D3, and further identifies the allowance time specifying information D1 associated with the identified terminal identification information D2.

For example, the transmission source identification information D3 and the terminal identification information D2 may be the same kind of information such as address information on the network 70. In this case, the main control portion 81 identifies the terminal identification information D2 that matches the transmission source identification information D3 associated with the presently received print job data D0, and identifies the allowance time specifying information D1 associated with the identified terminal identification information D2.

In the case where the transmission source identification information D3 and the terminal identification information D2 are different kinds of information, master information which represents a correspondence relationship between the transmission source identification information D3 and the terminal identification information D2 has been previously stored in the storage portion 812.

The main control portion 81 performing the process in step S105 is an example of an allowance time specifying information acquisition portion which acquires the allowance time specifying information D1 per print job data D0 from the storage portion 812.

Also, in step S105, the main control portion 81 may acquire the allowance time specifying information D1 from the transmission source of the print job data D0 via the network 70. In this case, the allowance time specifying information D1 has been previously stored in a storage portion of the terminal apparatus 7, and the terminal apparatus 7 transmits the allowance time specifying information D1 together with the print job data D0 to the image forming apparatus 10.

<Step S106>

Furthermore, the main control portion 81 specifies the allowance time ts of the transmission source of the presently received print job data D0 on the basis of the allowance time specifying information D1. The allowance time ts is a time from the data reception time tr of the print job data D0 to the time at which the sender of the print job data D0 reaches the self-apparatus.

For example, if the allowance time specifying information D1 is information on a time of movement from the seat of the sender of the print job data D0 to the image forming apparatus 10. The main control portion 81 specifies, as the allowance time ts, the time of movement represented by the allowance time specifying information D1.

If the allowance time specifying information D1 is information representing the path length from the seat of the sender of the print job data D0 to the image forming apparatus 10, the main control portion 81 specifies, as the allowance time ts, a time obtained by dividing the path length by a preset moving speed.

<Step S107>

Next, the main control portion 81 derives a planned start time tx for the presently received print job data D0 and stores the planned start time tx in the storage portion 812 such that the planned start time tx is associated with the presently received print job data D0.

The planned start time tx is a start time of the print process which is back-calculated from the time point when the allowance time ts specified by the allowance time specifying information D1 elapses after the data reception time tr, on the basis of a job required time tj which is a time required for the print process.

In other words, the planned start time tx is a time going back from the time point when the allowance time ts elapses after the data reception time tr, by a time equal to the job required time tj. For example, the planned start time tx is a time obtained by subtracting the job required time tj from the time obtained by adding the allowance time ts to the data reception time tr of the print job data D0, or may be a time obtained by adding a predetermined fine adjustment time to this time or by subtracting the predetermined fine adjustment time from this time.

For example, the job required time tj is calculated by applying, to a predetermined calculation formula, a coefficient corresponding to information such as the number of pages to be subjected to image formation in the print job data D0, the size of the sheet materials 9 in the conveyance direction, and whether print is single-side print or double-side print.

<Step S108>

On the other hand, if the print job data D0 received in step S101 is not the data for the adjustment designation, the main control portion 81 causes the print processing portion 20 to perform the print process for the received print job data D0, via the image formation control portion 83. The main control portion 81 repeats the process from step S101 after the process in step S107 or step S108.

[Standby Job Start Control]

Next, an example of the standby job start control performed by the main control portion 81 will be described with reference to a flowchart shown in FIG. 5. The standby job start control is performed by the MPU 811 executing a standby job start control program Pr2.

If the print job data D0 and the planned start time tx associated with the print job data D0 are present in the storage portion 812, the main control portion 81 performs the standby job start control in parallel with the job wait control. In the following description, S201, S202, . . . represent identification characters for respective steps executed by the main control portion 81.

<Step S201>

In the standby job start control, the main control portion 81 determines whether each print job data D0 present in the storage portion 812 is in a state where the planned start time tx has come. Hereinafter, the state where the planned start time tx has come is referred to as start enabled state. The main control portion 81 performing the process in step S201 is an example of a start possibility determination portion.

More specifically, if the present time outputted by the time counting portion 86 has reached the planned start time tx for each print job data D0, the main control portion 81 determines that the print job data D0 is in the start enabled state.

In addition, in step S201, for the print job data group, the main control portion 81 determines whether the print job data group is in the start enabled state, as a single unit. That is, the main control portion 81 determines whether the print job data group is in the start enabled state, on the basis of the data reception time tr of the last print job data D0 in the print job data group.

If no print job data D0 in the start enabled state is present, the main control portion 81 repeats the process in step S201. If the print job data D0 in the start enabled state is present, the main control portion 81 performs processes in the next step S202 and thereafter.

<Step S202>

If the print job data D0 in the start enabled state is present, the main control portion 81 generates a start enabled job list representing a queue of the print job data D0. The start enabled job list is a list in which the identification information of the print job data D0 determined as being in the start enabled state is aligned in order in which the planned start time tx is earlier. In other words, the start enabled job list is a list in which the identification information of the print job data D0 is aligned in order in which the print job data D0 is determined as being in the start enabled state.

For example, the transmission source identification information D3 may be used as the identification information of the print job data D0 in the start enabled job list.

<Steps S203 and S204>

Furthermore, the main control portion 81 determines whether a print start condition that the human sensor 801 detects a person and an elapsed time from the time of end of the immediately previous print process has reached a predetermined time interval, is satisfied. The main control portion 81 waits until the print start condition is satisfied. The time interval is, for example, a time that is several seconds to ten-odd seconds.

<Step S205>

If the print start condition is satisfied, the main control portion 81 causes the print processing portion 20 to perform the print process for the print job data D0 at the top in the start enabled job list, via the image formation control portion 83. Accordingly, the print process for the print job data D0 determined earliest as being in the start enabled state, among the print job data D0 remaining in the storage portion 812, is performed.

In addition, in step S205, for the print job data group, the main control portion 81 consecutively performs the print process for all the print job data D0 belonging to the print job data group. That is, the main control portion 81 collectively controls a start time of the print process for the print job data group.

During a period from the time of start of the print process to a time prior to start of the next print process, the main control portion 81 may display the transmission source information of the print job data D0 corresponding to the started print process, on the operation display portion 80.

The main control portion 81 deletes, in the storage portion 812, the print job data D0 for which the print process has been already performed and information on the start enabled job list corresponding to the print job data D0.

In steps S202, S203, and S205, when a person is detected by the human sensor 801, the main control portion 81 starts the print process for the print job data D0 in accordance with the order in which the print job data D0 is determined as being in the start enabled state.

A situation where the human sensor 801 detects a person in step S203 may be a situation where the sender of the print job data D0 of the start enabled state has reached the image forming apparatus 10. Accordingly, even if the sender of the print job data D0 reaches the image forming apparatus 10 later than usual, the print process is performed in synchronization with timing at which the sender reaches the image forming apparatus 10.

Because of the determination in step S204 as to the time interval, the print processes for a plurality of the print job data D0 the transmission sources of which are different are performed at the time interval as a break. Accordingly, the user who has reached the image forming apparatus 10 earlier is prevented from mistakenly taking both the own printed matter 9x and the printed matter 9x of the next user.

<Step S206>

Furthermore, the main control portion 81 stores the end time of the print process in the storage portion 812. The determination in step S204 as to the time interval is performed by comparing the time at the determination to the end time recorded in the step S206. After the process in step S206, the main control portion 81 repeats the process from step S201.

As described above, in steps S202 to S206, the main control portion 81 controls the start time of the print process for each print job data D0 stored in the storage portion 812, in accordance with the order in which the print job data D0 is determined as being in the start enabled state. The main control portion 81 performing the processes in steps S202 to S206 is an example of a print time control portion.

In the image forming apparatus 10 which performs the processes described above, the main control portion 81 performs the print process in synchronization with timing at which the user who has transmitted the print job data D0 from the terminal apparatus 7 reaches the self-apparatus, without requiring a complicated operation. Thus, the printed matter 9x can be prevented from being mistakenly taken.

If the print job data group composed of the plurality of print job data D0 the transmission sources of which are the same is present in the storage portion 812, the main control portion 81 collectively controls the start time of the print process for the print job data group (S104, S205). Thus, if a first user consecutively transmits a plurality of the print job data D0 in a relatively short time, the printed matter 9x of a second user can be prevented from being interposed between a plurality of the printed matters 9x of the first user.

Meanwhile, various methods for registering the allowance time specifying information D1 in the storage portion 812 are conceivable. For example, the terminal apparatus 7 may transmit, to the image forming apparatus 10, the allowance time specifying information D1 inputted in accordance with a user operation. In this case, the main control portion 81 stores the allowance time specifying information D1 received from the terminal apparatus 7, in the storage portion 812 such that the allowance time specifying information D1 is associated with the terminal identification information D2 corresponding to the transmission source of the allowance time specifying information D1.

In addition, the image forming apparatus 10 may have an automatic registration function to actually measure a time for which the user moves from the terminal apparatus 7 to the image forming apparatus 10 and register the allowance time specifying information D1 based on a result of the actual measurement, in the storage portion 812. Hereinafter, an example of an allowance information registration process which achieves the automatic registration function will be described.

[Allowance Information Registration Process]

Next, an example of a procedure of the allowance information registration process of registering the allowance time specifying information D1 in the storage portion 812 will be described with reference to a flowchart shown in FIG. 6. The allowance information registration process is performed by the MPU 811 executing an allowance information registration program Pr3.

Figure 6:
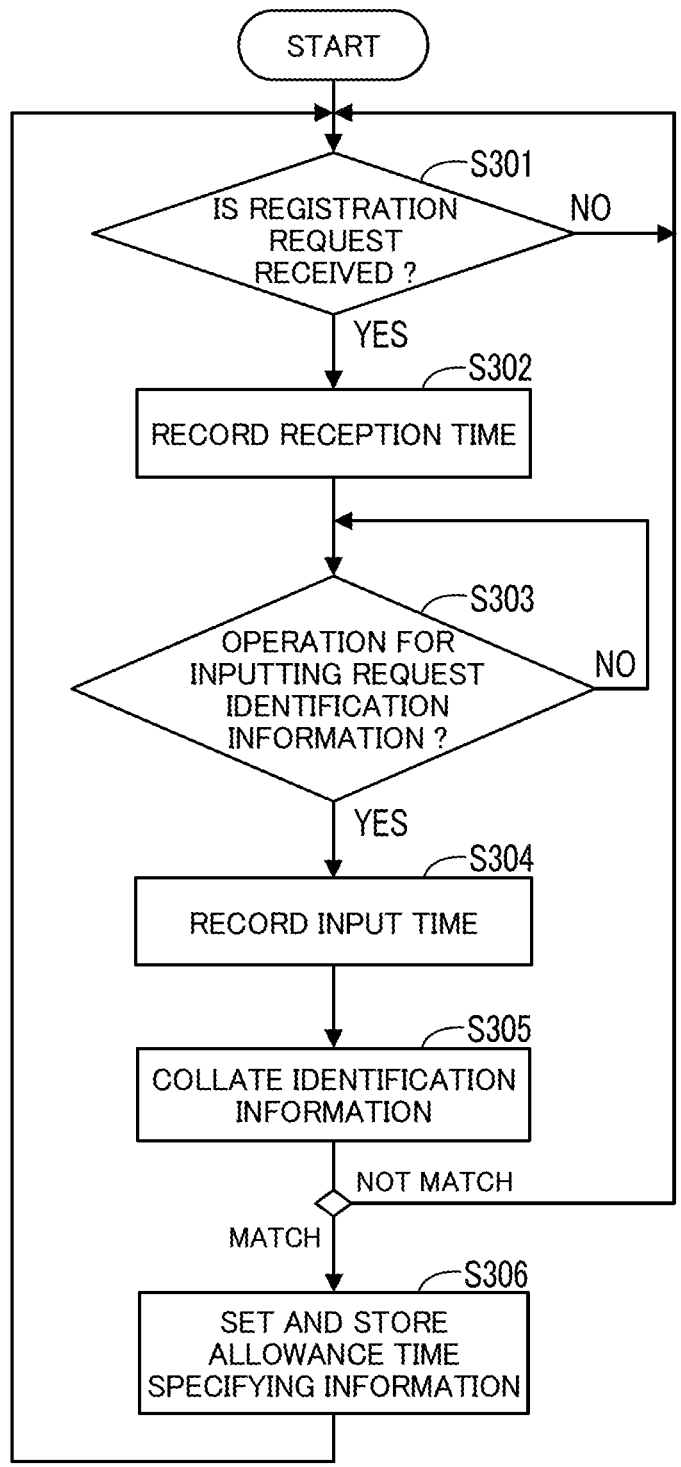
FIG. 6 is a flowchart showing an example of a procedure of an allowance information registration process performed by the image forming apparatus according to the first embodiment.

For example, when the main control portion 81 activates, the main control portion 81 starts the process shown in FIG. 6. In the following description, S301, S302, . . . represent identification characters for respective steps executed by the main control portion 81.

<Step S301>

First, the main control portion 81 monitors whether a predetermined registration request is received from any terminal apparatus 7, and receives the registration request from the terminal apparatus 7 via the network 70. The main control portion 81 performing the process in step S301 is an example of a registration request reception portion.

The terminal apparatus 7 transmits the registration request to the image forming apparatus 10 in accordance with an operation performed by the user, by executing a printer driver which is a preinstalled program.

<Step S302>

Upon reception of the registration request, the main control portion 81 records a reception time trx of the registration request in the non-volatile storage portion or the storage portion 812.

<Step S303>

Furthermore, after the reception of the registration request, the main control portion 81 monitors whether an operation for inputting request identification information corresponding to the registration request is performed on the operation display portion 80. For example, the request identification information may be the user authentication information Du inputted through the authentication information input portion 800.

If the request identification information is the user authentication information Du, master information which represents a correspondence relationship between the user authentication information Du and the terminal identification information D2 has been previously stored in the storage portion 812. The terminal identification information D2 in the master information may be the address information of each terminal apparatus 7 on the network 70. In addition, the registration request may include the terminal identification information D2 other than the address information.

<Step S304>

If the request identification information is inputted in step S303, the main control portion 81 records an input time ti of the request identification information in the non-volatile storage portion or the storage portion 812.

<Step S305>

Furthermore, the main control portion 81 collates the inputted request identification information with information on the transmission source of the registration request received in step S301, and determines whether the request identification information matches the information corresponding to the registration request.

If the request identification information does not match the information corresponding to the registration request, the main control portion 81 deletes the reception time recorded in step S302 and the input time recorded in step S304, and repeats the process from step S301.

Although omitted in FIG. 6, also if an elapsed time from the reception of the registration request has reached a predetermined upper limit time, the main control portion 81 deletes the reception time of the registration request recorded in step S302, and repeats the process from step S301.

<Step S306>

If the request identification information matches the information corresponding to the registration request, the main control portion 81 automatically sets the allowance time specifying information D1 corresponding to the time from the reception time trx of the registration request to the input time ti of the request identification information. Furthermore, the main control portion 81 stores the set allowance time specifying information D1 in the storage portion 812. At this time, the main control portion 81 stores the set allowance time specifying information D1 in the storage portion 812 such that the set allowance time specifying information D1 is associated with the terminal identification information D2 corresponding to the transmission source of the registration request.

For example, the main control portion 81 sets, as the allowance time specifying information D1, the time from the reception time trx of the registration request to the input time ti of the request identification information, or a time obtained by adding a predetermined fine adjustment time to this time or by subtracting the predetermined fine adjustment time from this time. In this case, the set allowance time specifying information D1 is information representing the allowance time is itself. After the process in step S306, the main control portion 81 repeats the process from step S301.

As described above, after the registration request is received, if the request identification information corresponding to the transmission source of the registration request is inputted in accordance with an operation on the image forming apparatus 10, the main control portion 81 performs the processes in steps S302 to S306.

In steps S302 to S306, the main control portion 81 automatically sets the allowance time specifying information D1 corresponding to the time from the reception time trx of the registration request to the input time ti of the request identification information. Furthermore, the main control portion 81 stores the set allowance time specifying information D1 in the storage portion 812 such that the set allowance time specifying information D1 is associated with the identification information of the transmission source of the registration request (S306). The main control portion 81 performing the processes in steps S302 to S306 is an example of a first allowance information registration portion.

Since the image forming apparatus 10 has the function of the allowance information registration process, the user themselves does not need to measure a time of movement from the own seat to the image forming apparatus 10, and the operation for setting the allowance time specifying information D1 can be simplified.

Second Embodiment

Next, an image forming apparatus 10A according to a second embodiment will be described with reference to FIGS. 7 and 8. The image forming apparatus 10A is different from the image forming apparatus 10 according to the first embodiment in some of the steps in the standby job start control.

Figure 7:
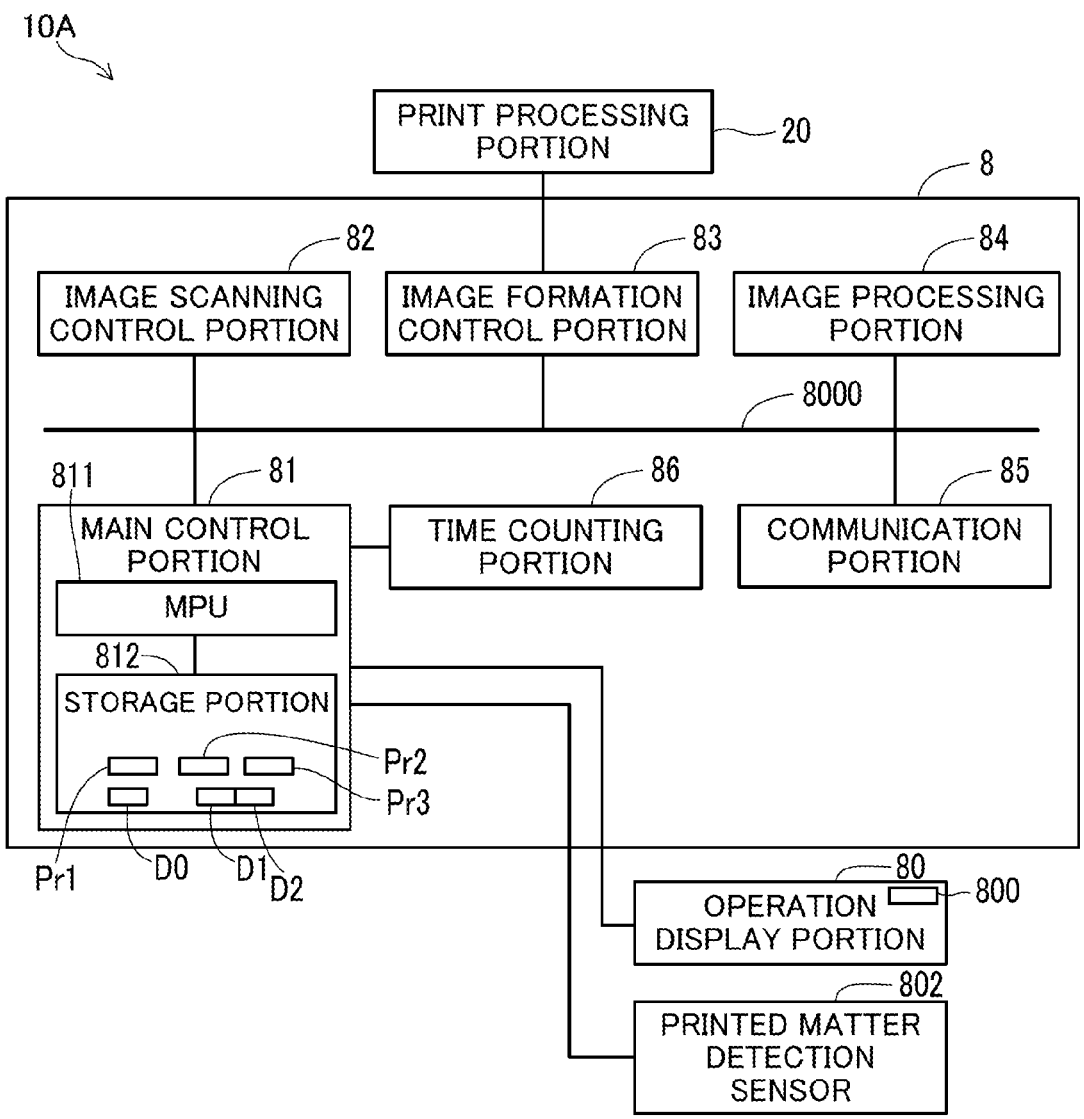
FIG. 7 is a block diagram of a control-related portion in an image forming apparatus according to a second embodiment.

FIG. 7 is a block diagram of a control-related portion in the image forming apparatus 10A. FIG. 8 is a flowchart showing an example of a procedure of the standby job start control performed by the image forming apparatus 10A. In FIG. 7, the same components as those shown in FIG. 3 are designated by the same reference characters. Hereinafter, the difference of the image forming apparatus 10A from the image forming apparatus 10 will be described.

The image forming apparatus 10A includes a printed matter detection sensor 802. The printed matter detection sensor 802 is a sensor which detects presence/absence of the printed matter 9x on the discharged sheet receiving portion 101. For example, the printed matter detection sensor 802 may be a microswitch which shifts to an ON state due to the weight of the printed matter 9x.

[Standby Job Start Control]

In the image forming apparatus 10A, the main control portion 81 controls timing at which the print process for the print job data D0 at the top in the start enabled job list is to be started, in accordance with a detection result of the printed matter detection sensor 802. Hereinafter, an example of the standby job start control in the image forming apparatus 10A will be described.

For example, when the main control portion 81 activates, the main control portion 81 starts the process shown in FIG. 7. In the following description, S401, S402, ... represent identification characters for respective steps executed by the main control portion 81.

<Step S401>

Figure 5:
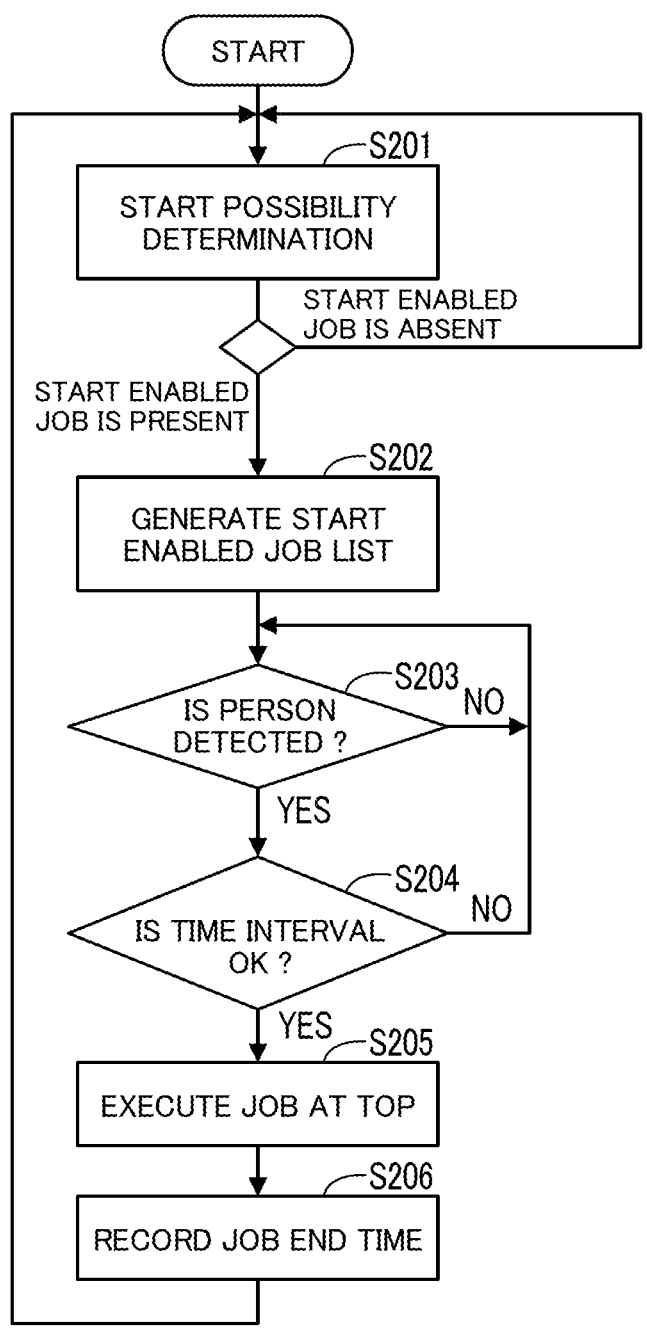
FIG. 5 is a flowchart showing an example of a procedure of standby job start control performed by the image forming apparatus according to the first embodiment.

In the standby job start control by the image forming apparatus 10A, similarly as in step S201 in FIG. 5, the main control portion 81 determines whether each print job data D0 present in the storage portion 812 is in the start enabled state.

If no print job data D0 in the start enabled state is present, the main control portion 81 repeats the process in step S401. If the print job data D0 in the start enabled state is present, the main control portion 81 performs processes in the next step S402 and thereafter.

<Step S402>

If the print job data D0 in the start enabled state is present, the main control portion 81 generates the start enabled job list similarly as in step S202 in FIG. 5.

<Steps S403 and S404>

Next, the main control portion 81 determines whether the present state is a state where the printed matter detection sensor 802 does not detect the printed matter 9x, as part of the print start condition (S403).

If the print start condition that the printed matter detection sensor 802 does not detect the printed matter 9x and an elapsed time from the time of end of the immediately previous print process has reached a predetermined time interval is satisfied, the main control portion 81 performs processes in steps S408 and S409.

On the other hand, if the print start condition is not satisfied, the main control portion 81 shifts to a reservation mode. The reservation mode is an operation state where start of the print process is reserved if the printed matter detection sensor 802 detects the printed matter 9x when the print job data D0 determined as being in the start enabled state is present.

<Step S405>

In the reservation mode, the main control portion 81 outputs a predetermined message via the operation display portion 80. For example, the message may be a notification text indicating that start of the print process is reserved until the printed matter 9x is removed from the discharged sheet receiving portion 101.

<Step S406>

Furthermore, in the reservation mode, the main control portion 81 determines whether an elapsed time from the shift to the reservation mode has reached a predetermined reservation upper limit time. Until the elapsed time from the shift to the reservation mode reaches the reservation upper limit time, the main control portion 81 repeats the processes in steps S403 to S406.

<Step S407>

If the elapsed time from the shift to the reservation mode has reached the reservation upper limit time while the state where the printed matter detection sensor 802 detects the printed matter 9x is kept, the main control portion 81 performs sheet insertion control. The sheet insertion control is control in which, prior to start of the print process, the sheet feed portion 2 and the sheet conveying portion 3 are caused to perform a process of discharging, to the discharged sheet receiving portion 101, a predetermined insertion sheet material different from the sheet material 9 used for the print process that is to be started.

The main control portion 81 causes the sheet feed portion 2 and the sheet conveying portion 3 to perform the process of discharging the insertion sheet material, via the image formation control portion 83.

That is, in step S407, prior to start of the print process, the main control portion 81 causes the sheet conveying portion 3 to perform the process of discharging, to the discharged sheet receiving portion 101, the insertion sheet material different from the sheet material 9 used for the print process that is to be started.

The process in step S407 is performed if the printed matter detection sensor 802 detects the printed matter 9x when the print job data D0 determined as being in the start enabled state is present (NO in S403). The main control portion 81 performing the process in step S407 is an example of a sheet insertion control portion.

For example, the insertion sheet material is the sheet material 9 that is set in a predetermined one of the plurality of sheet feed portions 2. For example, the insertion sheet material may be the sheet material 9 having a color, a size, or an orientation different from that of the sheet material 9 used for the print process that is to be started.

After the process in step S407, the main control portion 81 performs the processes in steps S408 and S409. The processes in steps S408 and S409 are the same as those in steps S205 and S206 in FIG. 5.

<Step S408>

If the print start condition is satisfied or if the insertion sheet material is discharged, similarly as in step S205 in FIG. 5, the main control portion 81 causes the print processing portion 20 to perform the print process for the print job data D0 at the top in the start enabled job list, via the image formation control portion 83.

<Step S409>

Furthermore, similarly as in step S206 in FIG. 5, the main control portion 81 stores an end time of the print process in the storage portion 812. After the process in step S409, the main control portion 81 repeats the process from step S401.

According to the present embodiment, because of the process in step S406, the print processes for the plurality of the print job data D0 the transmission sources of which are different are performed at the time interval as a break. Furthermore, because of the process in step S407, a plurality of the printed matters 9x for which the transmission sources are different are discharged to the discharged sheet receiving portion 101 such that the printed matters 9x are separated by the insertion sheet material. Thus, the user who has reached the image forming apparatus 10 earlier is prevented from mistakenly takes both the own printed matter 9x and the printed matter 9x of the next user.

Third Embodiment

Next, an image forming apparatus 10B according to a third embodiment will be described with reference to FIGS. 9 to 11. The image forming apparatus 10B is different from the image forming apparatus 10 according to the first embodiment in a step of acquiring the allowance time specifying information D1.

In the image forming apparatus 10B, the main control portion 81 divides the job wait control into first job wait control and second job wait control, and performs the first job wait control and the second job wait control.

Figure 9:
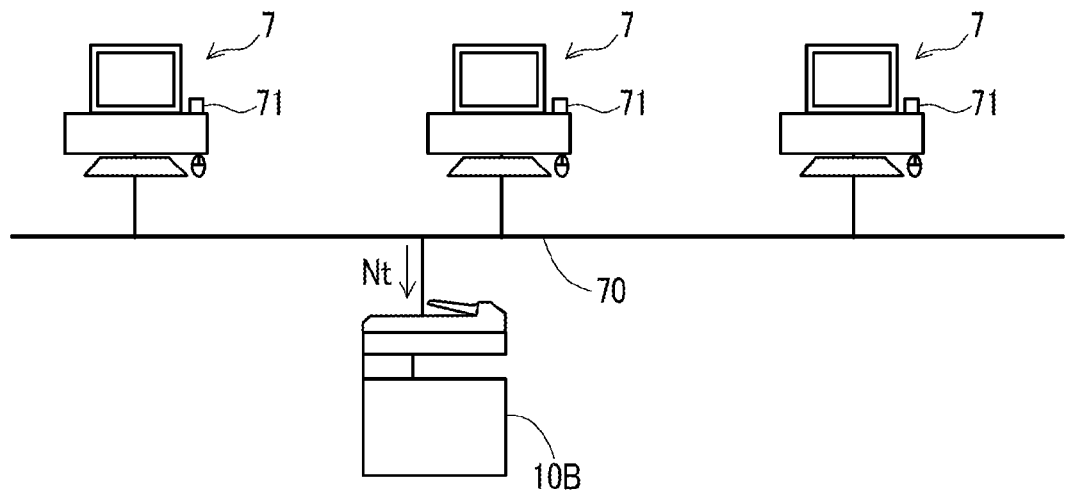
FIG. 9 is a configuration diagram of an image forming system including an image forming apparatus according to a third embodiment.

FIG. 9 is a configuration diagram of an image forming system including the image forming apparatus 10B. FIG. 10 is a flowchart showing an example of a procedure of the first job wait control. FIG. 11 is a flowchart showing an example of a procedure of the second job wait control. In FIG. 9, the same components as those shown in FIG. 1 are designated by the same reference characters. Hereinafter, the difference of the image forming apparatus 10B from the image forming apparatus 10 will be described.

Each terminal apparatus 7 in the present embodiment includes a human sensor 71 which detects a person in front of the self-apparatus. Furthermore, after transmitting the print job data D0, each terminal apparatus 7 performs a seat leaving notification transmission process by executing the preinstalled printer driver.

The seat leaving notification transmission process is a process of monitoring a detection state of the human sensor 71 after transmission of the print job data D0, and transmitting a predetermined seat leaving notification to the transmission destination of the print job data D0 when the human sensor 71 no longer detects a person.

In general, a time point when the human sensor 71 no longer detects a person after transmission of the print job data D0 is considered as a time point when the sender of the print job data D0 leaves the own seat to go to the image forming apparatus 10B.

In the seat leaving notification transmission process, if a plurality of the print job data D0 are transmitted to the same image forming apparatus 10B while a state where the human sensor 71 detects a person is kept, the terminal apparatus 7 transmits, to the image forming apparatus 10B, the one seat leaving notification corresponding to the plurality of the print job data D0.

[First Job Wait Control]

Figure 10:
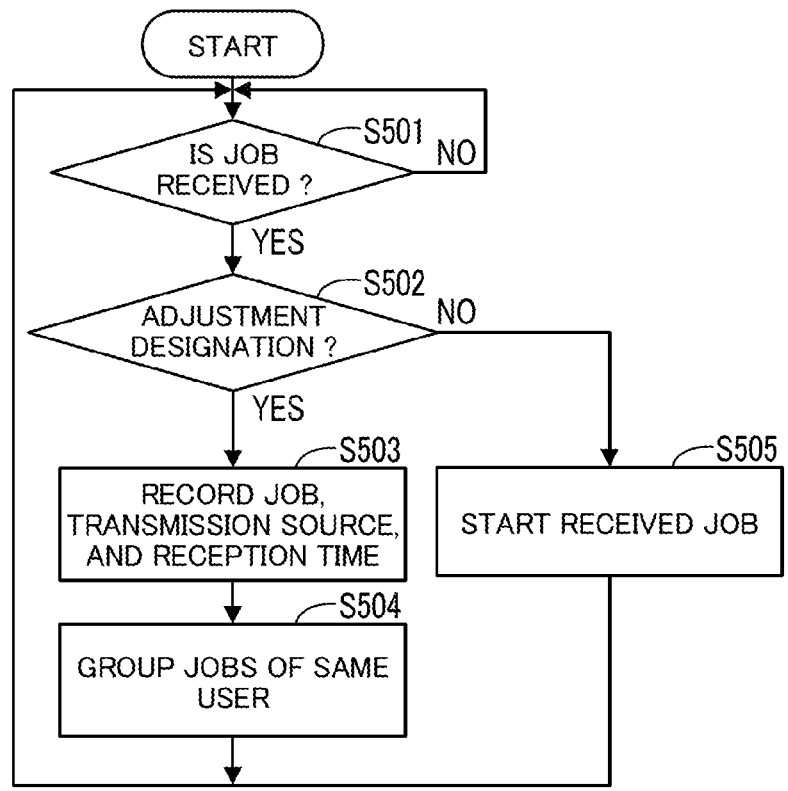
FIG. 10 is a flowchart showing an example of a procedure of first job wait control performed by the image forming apparatus according to the third embodiment.

For example, when the main control portion 81 activates, the main control portion 81 starts the process shown in FIG. 10. In the following description, S501, S502, . . . represent identification characters for respective steps executed by the main control portion 81. The respective steps in the first job wait control shown in FIG. 10 correspond to steps S101 to S104 and S108 shown in FIG. 4.

<Step S501>

Figure 4:
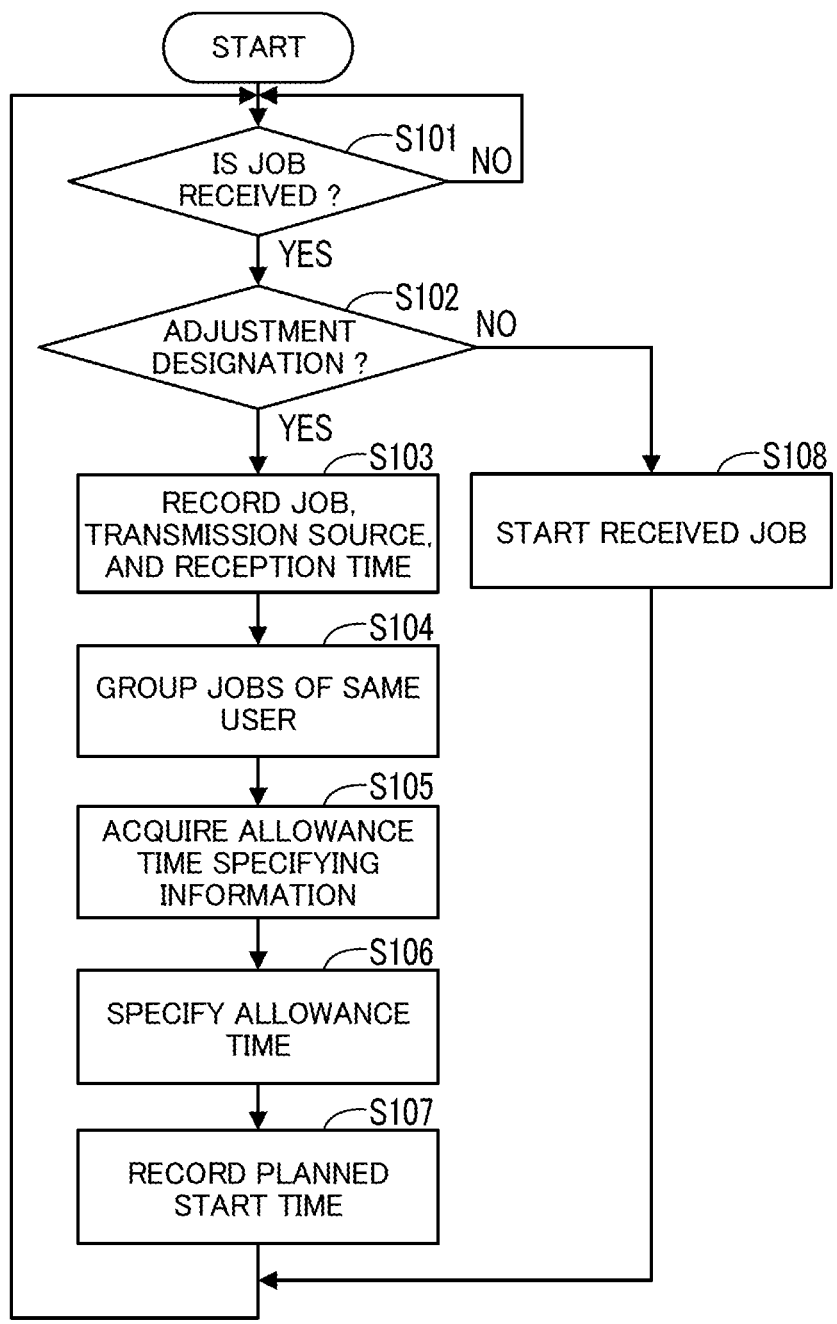
FIG. 4 is a flowchart showing an example of a procedure of job wait control performed by the image forming apparatus according to the first embodiment.

In the first job wait control, first, similarly as in step S101 in FIG. 4, the main control portion 81 monitors whether the print job data D0 is received from any terminal apparatus 7 via the communication portion 85, and receives the print job data D0.

<Step S502>

Furthermore, similarly as in step S102 in FIG. 4, the main control portion 81 determines whether the received print job data D0 is the data for the adjustment designation.

<Step S503>

If the print job data D0 is the data for the adjustment designation, similarly as in step S103 in FIG. 4, the main control portion 81 stores the received print job data D0, the transmission source information, and the data reception time tr in the storage portion 812 such that the received print job data D0, the transmission source information, and the data reception time tr are associated with each other.

<Step S504>

Furthermore, if a plurality of the print job data D0 the transmission sources of which are the same are present in the storage portion 812, the main control portion 81 performs a process of grouping the plurality of the print job data D0 the transmission sources of which are the same, similarly as in step S104 in FIG. 4.

<Step S505>

If the print job data D0 received in step S501 is not the data for the adjustment designation, the main control portion 81 causes the print processing portion 20 to perform the print process for the received print job data D0, via the image formation control portion 83 similarly as in step S108. After the process in step S504 or step S508, the main control portion 81 repeats the process from step S501.

[Second Job Wait Control]

Figure 11:
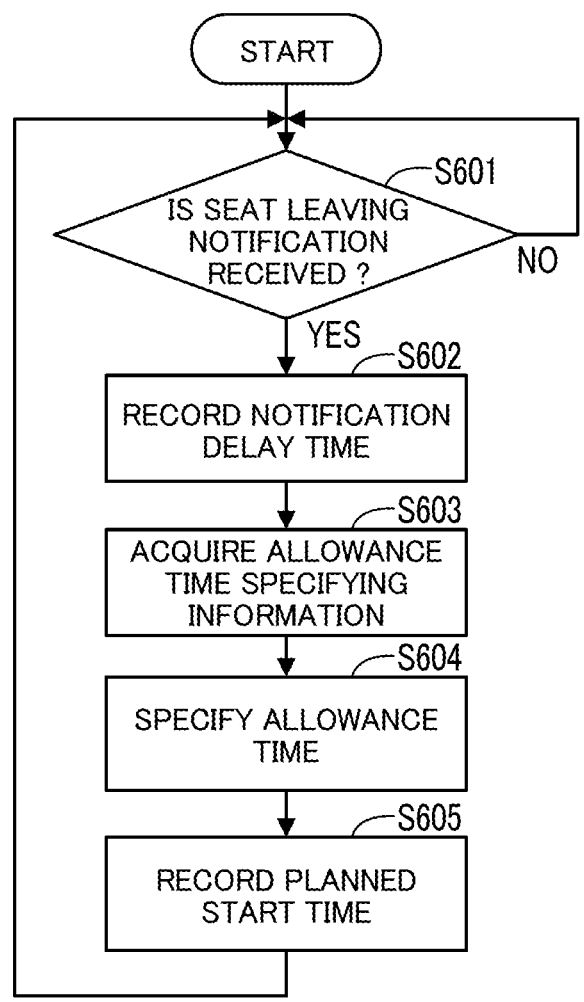
FIG. 11 is a flowchart showing an example of a procedure of second job wait control performed by the image forming apparatus according to the third embodiment.

The main control portion 81 performs the second job wait control shown in FIG. 11 in parallel with the first job wait control. In the following description, S601, S602, . . . represent identification characters for respective steps executed by the main control portion 81.

<Step S601>

In the second job wait control, first, the main control portion 81 monitors whether the seat leaving notification is received from the transmission source of the print job data D0 present in the storage portion 812, and receives the seat leaving notification.

As described later, the seat leaving notification is information used, for specifying the allowance time ts, together with the allowance time specifying information D1 which has been previously stored in the storage portion 812. The main control portion 81 performing the process in step S601 is an example of a seat leaving notification reception portion which receives the predetermined seat leaving notification from the transmission source of the print job data D0.

<Step S602>

Upon reception of the seat leaving notification from the transmission source of the print job data D0 present in the storage portion 812, the main control portion 81 stores a notification delay time td, which is the time from the data reception time tr to a notification reception time trm corresponding to the data reception time tr, in the storage portion 812 such that the notification delay time td is associated with the print job data D0.

<Step S603>

Furthermore, upon reception of the seat leaving notification from the transmission source of the print job data D0 present in the storage portion 812, the main control portion 81 reads the allowance time specifying information D1 corresponding to the transmission source of the seat leaving notification, from the storage portion 812 similarly as in step S105 in FIG. 4.

<Step S604>

Furthermore, the main control portion 81 specifies the allowance time ts of the transmission source of the print job data D0 corresponding to the presently received seat leaving notification, on the basis of the allowance time specifying information D1. In the present embodiment, the main control portion 81 specifies the allowance time ts corresponding to the notification delay time td and the allowance time specifying information D1 read from the storage portion 812.

For example, if the allowance time specifying information D1 is information on a time of movement from the seat of the sender of the print job data D0 to the image forming apparatus 10B, the main control portion 81 specifies, as the allowance time ts, a time obtained by adding the notification delay time td and the time of movement represented by the allowance time specifying information D1 to the data reception time tr. This is the difference from the process in step S106 in FIG. 4.

The allowance time specifying information D1 may be information representing the path length from the seat of the sender of the print job data D0 to the image forming apparatus 10B. In this case, the main control portion 81 specifies, as the allowance time ts, a time obtained by adding the notification delay time td and a time obtained by dividing the path length by the preset moving speed, to the data reception time tr.

That is, in the present embodiment, both the notification delay time td and the allowance time specifying information D1 in the storage portion 812 are information acquired, per print job data D0, as allowance time specifying information used for specifying the allowance time ts.

Therefore, in the present embodiment, the main control portion 81 performing the processes in steps S601 and S602 for acquiring the notification delay time td is an example of an allowance time specifying information acquisition portion which acquires a part of the allowance time specifying information D1 per print job data D0. Furthermore, the main control portion 81 performing the process in step S603 is also an example of the allowance time specifying information acquisition portion which acquires a part of the allowance time specifying information D1 per print job data D0 from the storage portion 812.

Under the assumption that the notification reception time trm, which is the reception time of the seat leaving notification, is a time at which the print job data D0 is received, the main control portion 81 may specify the allowance time ts similarly as in step S106 in FIG. 4. In this case, the starting point on the calculation of time merely shifts from the data reception time tr to the notification reception time trm. In this case as well, the allowance time ts to be specified is specified by the notification delay time td being handled substantially as a part of the allowance time specifying information D1.

<Step S605>

Next, similarly as in step S107, the main control portion 81 derives the planned start time tx for the print job data D0 corresponding to the presently received seat leaving notification, and stores the planned start time tx in the storage portion 812 such that the planned start time tx is associated with the print job data D0. After the process in step S605, the main control portion 81 repeats the process from step S601.

As described above, under the assumption that the notification reception time trm is the time at which the print job data D0 is received, the main control portion 81 may specify the allowance time is similarly as in step S106 in FIG. 4. In this case, the main control portion 81 derives the planned start time tx with the notification reception time trm as the starting point on the time calculation.

According to the present embodiment, even if the user of the terminal apparatus 7 leaves the own seat to go to the image forming apparatus 10B after some time from transmission of the print job data D0, the print process can be performed in synchronization with timing at which the user reaches the self-apparatus. Thus, the printed matter 9x can be assuredly prevented from being mistakenly taken.

Fourth Embodiment

Next, an image forming apparatus according to a fourth embodiment will be described with reference to FIGS. 12 and 13. The present embodiment is different from the first embodiment in the allowance information registration process for registering the allowance time specifying information D1 in the storage portion 812.

Figure 12:
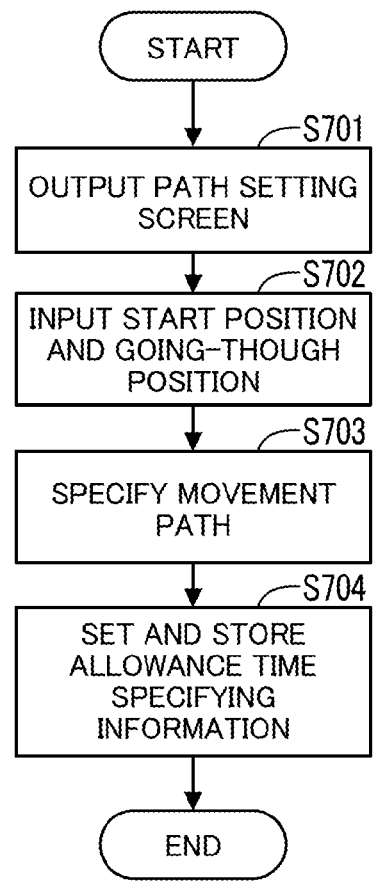
FIG. 12 is a flowchart showing an example of a procedure of an allowance information registration process performed by an image forming apparatus according to a fourth embodiment.

FIG. 12 is a flowchart showing an example of a procedure of the allowance information registration process performed by the main control portion 81 in the present embodiment. FIG. 13 is a diagram showing an example of a path setting screen g1 outputted by the main control portion 81 through the operation display portion 80 in the present embodiment.

Hereinafter, an example of the allowance information registration process in the fourth embodiment will be described. The allowance information registration process is performed by the MPU 811 executing the allowance information registration program Pr3.

When the main control portion 81 detects that a predetermined registration start operation has been performed on the operation display portion 80, the main control portion 81 starts the process shown in FIG. 12. In the following description, S701, S702, . . . represent identification characters for respective steps executed by the main control portion 81.

<Step S701>

Figure 13:
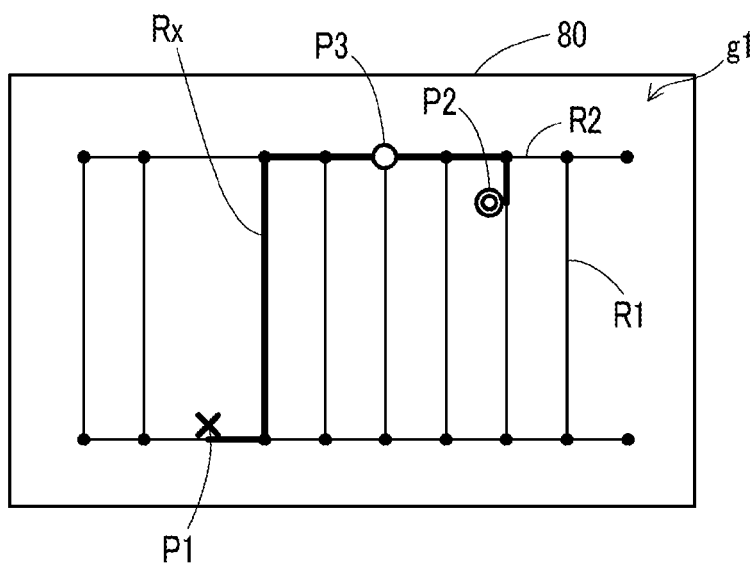
FIG. 13 is a diagram showing an example of a path setting screen outputted by the image forming apparatus according to the fourth embodiment.

In the allowance information registration process of the present embodiment, the main control portion 81 outputs the path setting screen g1 as shown in FIG. 13 through the operation display portion 80.

The path setting screen g1 is a screen through which information for specifying a path from the seat of the user to the image forming apparatus is inputted in accordance with an operation on the operation display portion 80. In the example shown in FIG. 13, the path setting screen g1 is a screen which displays a floor layout representing a goal position P1 which is the position of the self-apparatus, vertical paths R1, and horizontal paths R2.

Path information which specifies the goal position P1, the vertical paths R1, and the horizontal paths R2 on the floor layout, and scale information for specifying information on the actual length of each path have been previously set and stored in the storage portion 812.

The vertical paths R1 and the horizontal paths R2 are paths in directions that intersect each other. All paths from seats of respective users to the self-apparatus can be specified by combinations of the vertical paths R1 and the horizontal paths R2.

For example, the main control portion 81 may have a function to set the path information and the scale information in accordance with an operation on the operation display portion 80. In addition, the main control portion 81 may acquire the path information and the scale information that are set in the terminal apparatus 7, via the network 70, and may store the path information and the scale information in the storage portion 812.

The user performs, on the operation display portion 80, an operation for inputting a start position P2 which is the position of the own seat, and a going-through position P3 on the way on the floor layout. This inputting operation is, for example, an operation of touching designated positions on a touch panel, or an operation on a cursor moving key for moving a cursor to designated positions. An operation for inputting the going-through position P3 may be omitted.

<Step S702>

Next, the main control portion 81 inputs information on the start position P2 and the going-through position P3 in accordance with an operation on the operation display portion 80. The main control portion 81 executing steps S701 and S702 is an example of a position information input portion through which position information representing a positional relationship between the image forming apparatus and the terminal apparatus 7 is inputted.

<Step S703>

Furthermore, the main control portion 81 specifies a movement path Rx which is the shortest path from the inputted start position P2 through the inputted going-through position P3 to the goal position P1, from among all combinations of the vertical paths R1 and the horizontal paths R2.

<Step S704>

Next, the main control portion 81 sets the allowance time specifying information D1 corresponding to the movement path Rx and stores the allowance time specifying information D1 in the storage portion 812. The allowance information registration process ends after the process in step S704.

For example, the main control portion 81 sets, as the allowance time specifying information D1, the path length of the movement path Rx or a time obtained by dividing the path length by the preset moving speed.

The main control portion 81 stores the set allowance time specifying information D1 in the storage portion 812 such that the set allowance time specifying information D1 is associated with the terminal identification information D2. For example, the user authentication information Du may be inputted through the authentication information input portion 800 prior to the registration start operation, and may be used as the terminal identification information D2.

In addition, master information which represents a correspondence relationship between the user authentication information Du and the terminal identification information D2 may have been previously stored in the storage portion 812. In this case, the terminal identification information D2 corresponding to the user authentication information Du inputted through the authentication information input portion 800 may be used as information associated with the allowance time specifying information D1.

In steps S703 and S704, the main control portion 81 stores the allowance time specifying information D1 corresponding to a time of movement on the path from the terminal apparatus 7 identified by the position information to the image forming apparatus, in the storage portion 812 such that the allowance time specifying information D1 is associated with the terminal identification information D2. The main control portion 81 performing the processes in steps S703 and S704 is an example of a second allowance information registration portion.

According to the present embodiment, the user themselves does not need to measure a time of movement from the own seat to the image forming apparatus, and an operation for setting the allowance time specifying information D1 can be simplified.

Application Examples

In the standby job start control shown in FIG. 5 in the first embodiment, one of or both the process in step S203 based on the detection result of the human sensor 801 and the process in step S204 regarding the time interval may be omitted.

Figure 8:
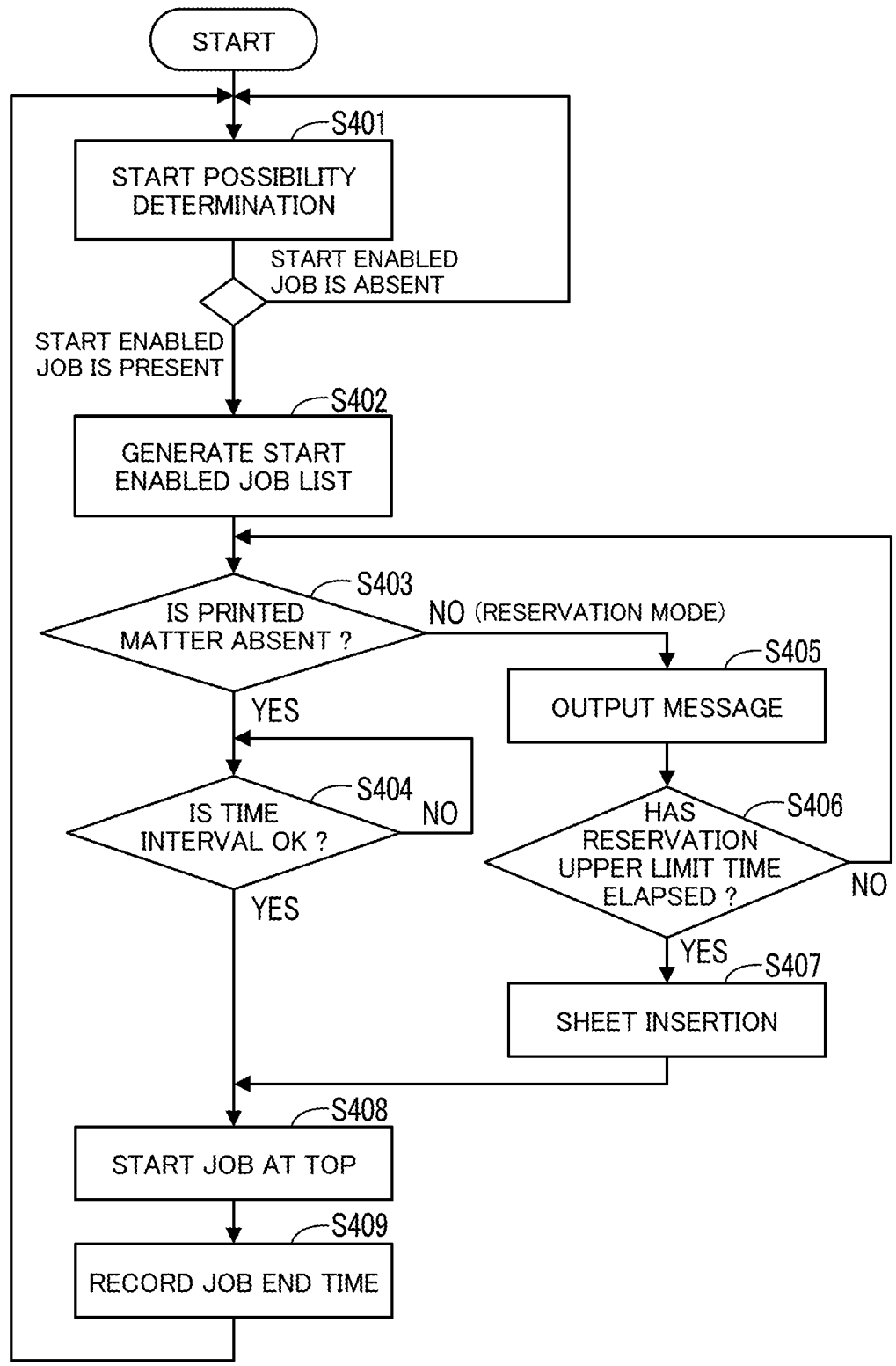
FIG. 8 is a flowchart showing an example of a procedure of standby job start control performed by the image forming apparatus according to the second embodiment.

Similarly, in the standby job start control shown in FIG. 8 in the second embodiment, the process in step S404 regarding the time interval may be omitted.

In the standby job start control shown in FIG. 8 in the second embodiment, one of or both the process in step S406 regarding the reservation upper limit time and the process in step S407 regarding the insertion sheet material may be omitted.

In the second job wait control shown in FIG. 11 in the third embodiment, the process in step S603 of acquiring the allowance time specifying information D1 from the storage portion 812 may be omitted. In this case, the notification delay time td acquired in the processes in steps S601 and S602 is the allowance time specifying information used for specifying the allowance time ts. For example, in step S604, the notification delay time td or a time obtained by adding a preset fine adjustment time to the notification delay time td or subtracting the present fine adjustment time from the notification delay time td is specified as the allowance time ts.

In each embodiment, the MPU 811 may count an elapsed time from the time of reception of the print job data D0, or an elapsed time from the time of reception of the seat leaving notification, etc.

In each embodiment, an operation mode when the human sensor 801 detects a person in a state where a plurality of the print job data D0 in the start enabled state are present in the storage portion 812 may be selectable from a plurality of modes, and, for example, may be selectable from two or more candidates among the following three modes.

The first mode is an operation mode in which, among the plurality of the print job data D0 present in the storage portion 812, the print job data D0 determined earliest as being in the start enabled state and the other print job data D0 that is determined as being in the start enabled state subsequently to the earliest print job data D0 and the transmission source of which is the same as that of the earliest print job data D0 become targets on which the print process is to be performed. In this case, if the transmission source of the print job data D0 determined earliest as being in the start enabled state and the transmission source of the other print job data D0 subsequent thereto are not the same, only the earliest print job data D0 becomes a target on which the print process is to be performed.

The second mode is a mode in which, among the plurality of the print job data D0 in the start enabled state present in the storage portion 812, the print job data D0 determined earliest as being in the start enabled state and the other print job data D0 the transmission source of which is the same as that of the earliest print job data D0 become targets on which the print process is to be performed. In this case, if any other print job data D0 the transmission source of which is the same as that of the print job data D0 determined earliest as being in the start enabled state is not present, only the earliest print job data D0 becomes a target on which the print process is to be performed.

The third mode is a mode in which all of the plurality of the print job data D0 in the start enabled state present in the storage portion 812 become targets on which the print process is to be performed.

In each embodiment, when the human sensor 801 continuously detects a person in a state where a plurality of the print job data D0 in the start enabled state are present in the storage portion 812, the main control portion 81 may perform the following process. For example, after the main control portion 81 performs the print process in the first mode or second mode, the main control portion 81 may reserve the print process for the next print job data D0 until the human sensor 801 detects a person again after the human sensor 801 no longer detects a person.

The image forming apparatus according to the present disclosure can be configured by freely combining the embodiments and application examples described above, or modifying or partially omitting the embodiments and the application examples as appropriate, within the scope of the invention recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
  a non-transitory computer-readable job storage portion, which is a storage device configured to temporarily store print job data received from a terminal apparatus via a network;
  a print processing device including a sheet conveying portion configured to convey a sheet material and an image forming portion configured to form an image on the sheet material being conveyed, the print processing device being configured to perform a print process of forming an image of developer, represented by the print job data, on the sheet material and discharging a printed matter which is the sheet material on which the image has been formed, to a discharged sheet receiving portion; and
  a processor configured to execute:
    an allowance time specifying information acquisition portion configured to acquire, per the print job data, allowance time specifying information used for specifying an allowance time from a time of reception of the print job data to a time at which a sender of the print job data reaches a self-apparatus;
    a start possibility determination portion configured to determine whether each print job data stored in the job storage portion is in a start enabled state where a planned start time has come which is back-calculated from a time point when the allowance time specified by the allowance time specifying information elapses after the reception of the print job data, on the basis of a time required for the print process; and
    a print time control portion configured to control a start time of the print process for each print job data stored in the job storage portion, in accordance with an order in which the print job data is determined as being in the start enabled state, wherein
  if a print job data group composed of a plurality of the print job data transmission sources that are the same is present in the job storage portion, the start possibility determination portion determines whether the print job data group is in the start enabled state, on the basis of a time of reception of the last print job data in the print job data group, and the print time control portion collectively controls a start time of the print process for the print job data group.

2. The image forming apparatus according to claim 1, further comprising a human sensor configured to detect a person close thereto, wherein
while a person is detected by the human sensor, the print time control portion starts the print process for the print job data in the order in which the print job data is determined as being in the start enabled state.

3. The image forming apparatus according to claim 1, further comprising a printed matter detection sensor configured to detect presence/absence of the printed matter on the discharged sheet receiving portion, wherein
if the printed matter detection sensor detects the printed matter when the print job data determined as being in the start enabled state is present, the print time control portion shifts to a reservation mode in which start of the print process is reserved.

4. The image forming apparatus according to claim 1, further comprising:
a printed matter detection sensor configured to detect presence/absence of the printed matter on the discharged sheet receiving portion, wherein
the processor is further configured to execute a sheet insertion control portion configured to cause the sheet conveying portion to perform a process of discharging a predetermined insertion sheet material different from the sheet material used for the print process that is to be started, to the discharged sheet receiving portion prior to start of the print process if the printed matter detection sensor detects the printed matter when the print job data determined as being in the start enabled state is present.

5. The image forming apparatus according to claim 1, wherein the allowance time specifying information acquisition portion acquires the allowance time specifying information corresponding to a transmission source of the print job data, from a registered information storage portion configured to previously store the allowance time specifying information associated with identification information of the terminal apparatus.

6. The image forming apparatus according to claim 5, wherein the processor is further configured to execute:
a registration request reception portion configured to receive a predetermined registration request from the terminal apparatus via the network; and
a first allowance information registration portion configured to, if request identification information corresponding to a transmission source of the registration request is inputted in accordance with an operation on the image forming apparatus after the registration request is received, automatically set the allowance time specifying information corresponding to a time from a time of the reception of the registration request to a time of the input of the request identification information, and store the set allowance time specifying information in the registered information storage portion such that the set allowance time specifying information is associated with identification information of the transmission source of the registration request.

7. The image forming apparatus according to claim 5, wherein the processor is further configured to execute:
a position information input portion through which position information representing a positional relationship between the image forming apparatus and the terminal apparatus is inputted; and
a second allowance information registration portion configured to store the allowance time specifying information corresponding to a time of movement on a path from the terminal apparatus to the image forming apparatus which time is specified by the position information, in the registered information storage portion such that the allowance time specifying information is associated with the identification information of the terminal apparatus.

8. The image forming apparatus according to claim 1, wherein the allowance time specifying information acquisition portion acquires the allowance time specifying information from a transmission source of the print job data via the network.

9. The image forming apparatus according to claim 1, wherein
the processor is further configured to execute a seat leaving notification reception portion configured to receive a predetermined seat leaving notification from a transmission source of the print job data, and
the allowance time specifying information acquisition portion acquires, as at least a part of the allowance time specifying information, a time from a time of reception of the print job data to a time of reception of the seat leaving notification corresponding to the print job data.

* * * * *